UNITED STATES PATENT OFFICE.

JOHN M. LUTHER, OF SALINA, NEW YORK, ASSIGNOR TO WM. E. HARTSHORN, OF SAME PLACE.

IMPROVEMENT IN PROCESSES OF PURIFYING BRINE FOR THE MANUFACTURE OF SALT.

Specification forming part of Letters Patent No. 33,725, dated November 12, 1861.

*To all whom it may concern:*

Be it known that I, J. M. LUTHER, of Salina, in the county of Onondaga and State of New York, have invented a new and useful Improvement in the Manufacture of Salt; and I do hereby declare that the following is a full, clear, and exact description of the same.

This invention consists in the introduction into the brine in the manufacture of salt by boiling of bicarbonate of soda or sal-soda for the purpose of neutralizing or expelling by precipitation the impurities, such as the chlorides of calcium and magnesium and sulphate of lime.

In carrying out my invention no change is required in the apparatus commonly employed in the manufacture of salt by the boiling process. The alkali may be introduced into the reservoirs from which the brine is supplied to the boiling-kettles or into the kettles themselves. The alkali which I propose generally to use is bicarbonate of soda, and the quantity thereof about four ounces for every one hundred gallons of saturated brine, and a proportionately smaller quantity to the same quantity of brine of a less strength. A smaller proportion of alkali may, however, be used with good results, and a much larger quantity without injury; but the proportion by which the best results may be obtained must of course vary according as the brine is more or less impure, so that it must in some degree be determined by the observation of the experienced salt-boiler. I introduce this alkali to the brine either in a dry state or in a solution.

I sometimes use, instead of the bicarbonate of soda, a saturated solution of sal-soda in the proportion of from one to three quarts to every one hundred gallons of saturated brine. The precipitation of the impurities produced by the addition of the soda takes place immediately or soon after the addition of the latter to the brine, and the impurities are removed from the brine before the salt begins to "make" by means of the "bittering-pans" commonly used for the removal of precipitated impurities.

I do not claim broadly the use of alkali in the manufacture of salt, for the purpose herein specified; but

What I claim as my invention, and desire to secure by Letters Patent, is—

The introduction of bicarbonate of soda or sal-soda into the brine in the manufacture of salt by the boiling process, either before or during the boiling process, substantially as and for the purpose herein specified.

J. M. LUTHER.

Witnesses:
   JOHN HARTSHORN,
   JOHN STACY.